(12) United States Patent
Fernald

(10) Patent No.: US 7,589,514 B1
(45) Date of Patent: Sep. 15, 2009

(54) METHOD FOR ACCURATE CURRENT SENSING IN POWER CONVERTERS

(75) Inventor: Kenneth W. Fernald, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 239 days.

(21) Appl. No.: 11/366,260

(22) Filed: Mar. 2, 2006

Related U.S. Application Data

(60) Provisional application No. 60/723,282, filed on Oct. 3, 2005.

(51) Int. Cl.
*G01R 19/00* (2006.01)
*G01R 31/08* (2006.01)

(52) U.S. Cl. ............ 324/76.11; 324/522; 702/64

(58) Field of Classification Search ............ 324/76.11, 324/522, 111; 361/87; 702/64; 204/229.8; 219/497; 318/650; 323/277
See application file for complete search history.

(56) References Cited

U.S. PATENT DOCUMENTS

| | | | | |
|---|---|---|---|---|
| 4,468,724 A | * | 8/1984 | Omae et al. | 363/88 |
| 4,542,440 A | | 9/1985 | Chetty et al. | |
| 4,761,727 A | | 8/1988 | Kammiller | |
| 4,954,960 A | * | 9/1990 | Lo et al. | 702/124 |
| 5,485,093 A | * | 1/1996 | Russell et al. | 324/522 |
| 5,677,606 A | * | 10/1997 | Otake | 318/434 |
| 5,864,493 A | * | 1/1999 | Boesch et al. | 708/300 |
| 6,411,531 B1 | * | 6/2002 | Nork et al. | 363/60 |
| 6,424,129 B1 | | 7/2002 | Lethellier | |
| 6,426,612 B1 | | 7/2002 | Rozsypal | |
| 6,441,597 B1 | | 8/2002 | Lethellier | |
| 6,700,365 B2 | | 3/2004 | Isham et al. | |
| 6,765,372 B2 | | 7/2004 | Isham | |
| 6,781,354 B2 | | 8/2004 | Zhang | |
| 6,812,677 B2 | | 11/2004 | Walters et al. | |
| 6,909,266 B2 | | 6/2005 | Kernahan et al. | |
| 6,952,334 B2 | * | 10/2005 | Ball et al. | 361/93.9 |
| 6,979,987 B2 | | 12/2005 | Kernahan et al. | |
| 7,030,596 B1 | * | 4/2006 | Salerno et al. | 323/282 |
| 7,113,122 B2 | | 9/2006 | Gangstoe et al. | |
| 7,126,315 B2 | | 10/2006 | Seo | |

(Continued)

*Primary Examiner*—Vincent Q Nguyen
*Assistant Examiner*—Hoai-An D Nguyen
(74) *Attorney, Agent, or Firm*—Meyertons Hood Kivlin Kowert & Goetzel, P.C.; Jeffrey C. Hood

(57) ABSTRACT

A simple digital-to-analog converter (DAC) may be used to monitor a load current. The DAC may be configured to generate a voltage corresponding to an estimate of an average value of the load current. A comparator may be used to compare that voltage with a sense voltage corresponding to the actual load current. The estimate may then be adjusted based on a sample of the comparator output, allowing the estimate to track the load current over time, thus providing an average measurement capability without using a fast analog-to-digital converter. The DAC may additionally be configured to generate respective voltages corresponding to specified over-current (OC) and under-current (UC) values. The comparator may then be used to compare these respective voltages with the sense voltage to respectively detect OC and UC faults. Noise immunity may be increased by integrating a number of comparator samples instead of a single comparator sample before adjusting the estimate. Increased noise immunity may also provide a measure of the error between the estimate and the actual load current, improving the efficiency of monitoring the load current.

16 Claims, 10 Drawing Sheets

U.S. PATENT DOCUMENTS

| | | |
|---|---|---|
| 7,196,486 B2 * | 3/2007 | Nakamura et al. .......... 318/469 |
| 7,312,969 B2 * | 12/2007 | Matsumoto et al. ........ 361/93.9 |
| 2005/0225307 A1 | 10/2005 | Sato et al. |
| 2006/0001408 A1 | 1/2006 | Southwell et al. |
| 2006/0284753 A1 | 12/2006 | Gangstoe et al. |

* cited by examiner

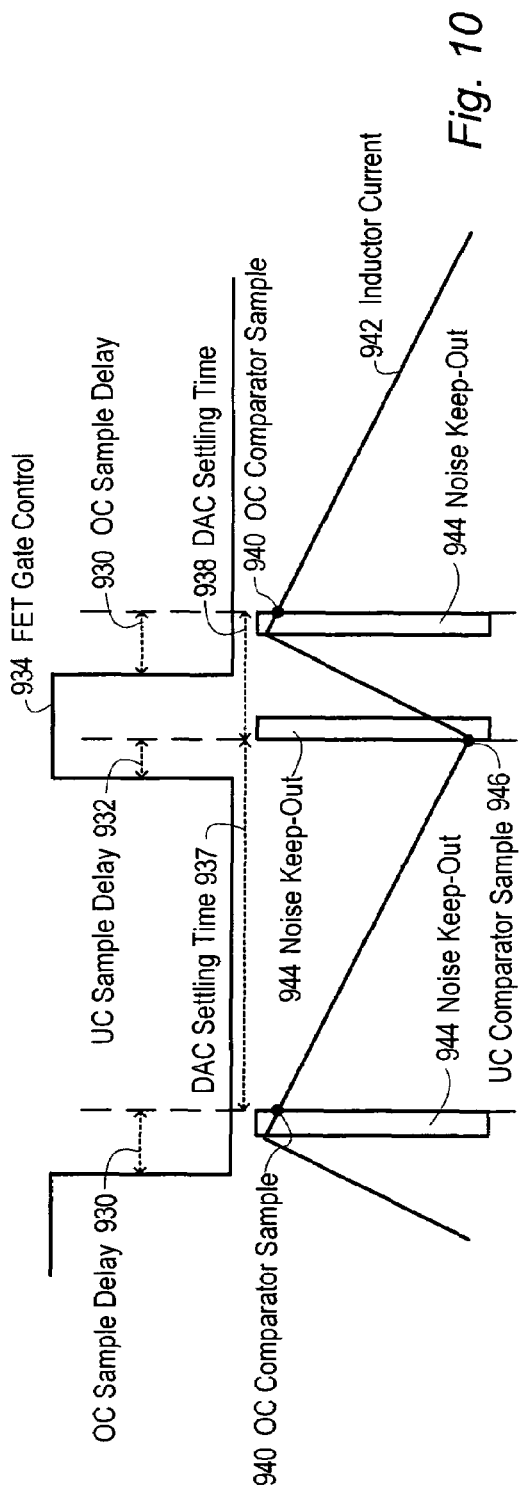
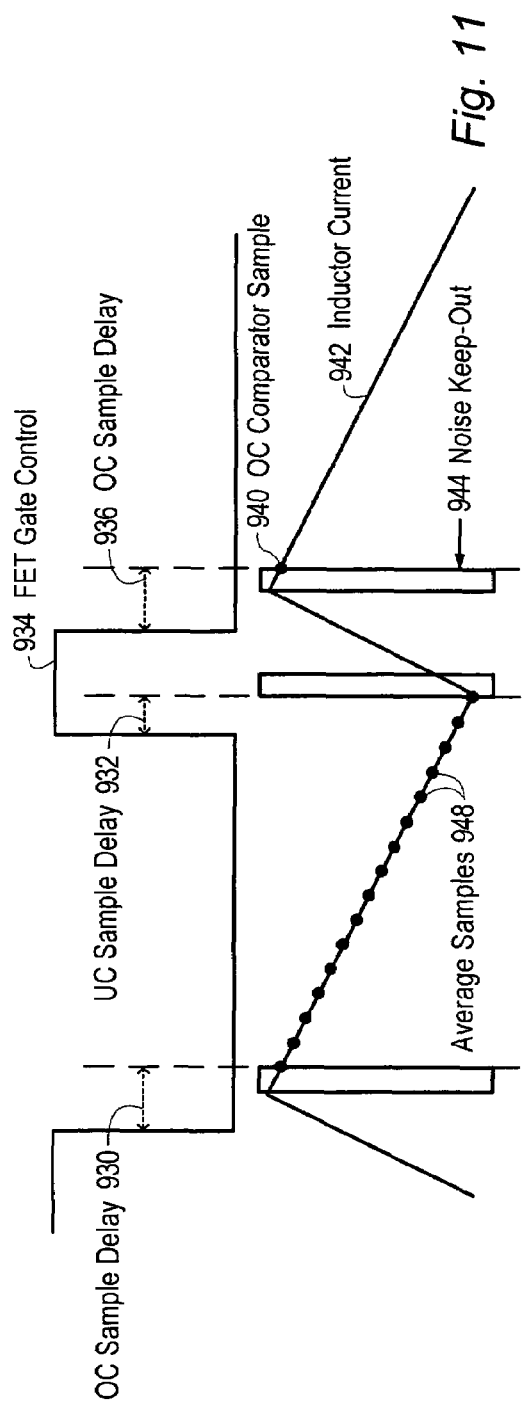

METHOD FOR ACCURATE CURRENT SENSING IN POWER CONVERTERS

This application claims benefit of priority of U.S. provisional application Ser. No. 60/723,282 titled "System and Method for Implementing Distributed Power Management", filed Oct. 3, 2005.

BACKGROUND OF THE INVENTION

1. Field of the Invention

This invention relates to power converters and, more particularly, to incorporating power-management functions in power converters.

2. Description of the Related Art

From 1995 to 2001, the highest density processors from manufacturers such as Intel went from a power consumption rate of about 30 Watts at 3.3 V to a power consumption rate of about 90 Watts delivered at 1.5 V. A simple application of the power-voltage-current relationship reveals that the total current consumed by these chips has increased from nine amps to about 60 amps in a very short time period. There are similar analogies with all larger digital integrated circuits (ICs).

This rapid evolution has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL). FIG. 1 is an illustration of a prior art power distribution system. As shown in FIG. 1, a power distribution scheme 100 may comprise an AC to DC converter 102 generating output voltages V1, V2, V3, and V4 that may be distributed to various point of load devices (POLs). However, it may not be practical to route high-current signals throughout a system.

To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA, and is illustrated in FIG. 2. As shown in PDA system 200 of FIG. 2, an AC to DC voltage converter 202 may produce an intermediate DC voltage Vx, which may be routed to individual local DC to DC converters 204, 206, 208, and 210, which in turn may provide the required DC voltages V1, V2, V3, and V4, respectively, to their corresponding POLs. With a DPA, errors may be reduced since the distance traveled by a high-current signal is minimized, thus reducing I×R (resistive) and L di/dt (inductive) errors.

In many power distribution systems it is typically not enough to just distribute power around a system to the various POLs. Complex electronic systems are generally monitored and controlled to ensure maximum reliability and performance. Functions (power supply features) typically implemented in DPA systems are listed below.

Supply Sequencing

A modern electronic system can contain many ICs and each IC can have several supply voltage requirements. For example, core logic may require one voltage and the I/O may require a different voltage. This typically results in a need for setting the order in which the voltages on a single chip are applied and the order in which the chips in a system are powered up.

Hot Swap

Many electronic systems, including computers, telecom racks, storage devices and battery-operated devices require "hot swap" capability. Hot swap capability typically comprises the live attachment of a device to power, i.e., attaching a device to a system that is powered up (without having to power down the system prior to the attachment). Examples of hot swap events may include installing a battery in a PDA or plugging a USB device into a computer.

Ramp Control

It is sometimes necessary to control the rate at which the DC output voltage of a converter ramps from its initial value to its nominal value. This may be done in support of managing a hot-swap event, sequencing requirement or satisfying the requirements of the load.

Voltage Programming

The final voltage presented to a load may need to be programmed to the desired value or may need to be "trimmed" to a precise value. Some systems require active voltage programming of devices during their use.

Load Monitoring

In order to maintain high reliability of an electronic system, monitoring of load status is sometimes required. Both current and voltage may need to be monitored and action may need to be taken based on the load status measurements. Current and voltage may also need to be monitored for undershoot and overshoot conditions. In some systems, when an error is detected, the system may take corrective action by switching the load off, isolating the load or just setting a system flag.

Tracking

Many times it is desirable to have the output of one more converters follow, or mirror, the output of one or more other converters in the system. Tracking a specific voltage level, for example, may include setting the voltage level of a tracking converter or device to the voltage level of a tracked converter or device, and changing the voltage level of the tracking device to match the voltage level of the tracked device any time the voltage level of the tracked device changes. In some cases the voltage levels of tracking devices and tracked devices may not be the same; changes in the tracked voltage level would simply be mirrored in the voltage output of the tracking devices. For example, if the tracked voltage increases by 0.2V, the tracking voltage would also increase by 0.2V.

Temperature Monitoring

Dense electronic systems often generate excessive waste heat. The excessive heat generally needs to be removed in order to keep the electronics operating at their safe operating temperature. Therefore, the temperature of individual loads as well as the temperature of various locations within the system's enclosure is typically monitored. When temperatures reach unacceptable limits, action may need to be taken locally and/or at the system level. Such corrective actions often include turning on or speeding up fans, setting an alarm or simply shutting down the power to the problematic load. Temperatures can be measured using several methods. Some large digital processors sometimes incorporate embedded temperature sensor diodes on chip. Other systems may employ thermistors and IC temperature sensors.

Fan Speed Control

In conjunction with temperature monitoring it is often necessary to monitor and control fan speed. This may be done to control airflow or to control acoustic noise.

Phase Control

DC voltage is typically stepped down in one of two ways, linear regulation and DC-to-DC conversion. DC-to-DC converters may step down DC voltage by pulse width modulation (PWM) of an input voltage and passive filtering of the output. The duty cycle of the PWM signal generally approximates the ratio of output voltage to input voltage divided by the efficiency of the converter. For example, for an ideal DC-to-DC converter with a desired output of 1.2V and an input of 12V, the duty cycle would be 10%. In high current applications, it is often desirable to force the various DC-to-DC converters to sample different "phases" of their clock cycle. That is, to prevent DC-to-DC converters in a system from all sampling the first 10% of a clock cycle, one converter may sample the first 10% of the clock cycle and the next converter may sample a different 10% of the clock cycle, and so on. This typically reduces noise and improves transient response. This technique is also used in motor control and is often implemented to control multiple fans in a system. PWM controlled fans with staggered phase typically offer reduced acoustic noise.

Current Sharing

In addition to forcing DC-to-DC converters to sample staggered phases of the switching clock, it is sometimes desirable to force two or more independent converters to each deliver an equal share of the load current. This approach provides improved noise and transient response in high-current applications.

Programmable Switching Frequency

Certain DC-to-DC converters feature programmable switch frequencies. Frequencies may be selected based on several system concerns.

Synchronization of Switching Clocks

It is often desirable to synchronize the switching frequency of DC-to-DC converters in a system to each other or to some other system clock. This is typically performed to reduce the probability of mixing the clock or its harmonics with important system clocks. It is of particular interest in communication applications.

There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement gluelogic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system.

In an effort to tie all or most of these functions together at the system level, one approach has been to implement the functions in control ICs responsible for controlling respective POL converters. Some of the functionality may also be programmed into a microcontroller that may communicate with attached POL converters over an I2C (inter-IC communication) bus to coordinate control of all POL converters in the system. FIG. 3 illustrates an example of an I2C-based system. As shown in FIG. 3, a microcontroller 302 may be coupled to POL converters 320, 322, 324, and 326, with the connections between the devices representing an I2C bus. A configuration as shown in FIG. 3 is typically not suited for active control and is used mainly for status monitoring, where POL converters 320, 322, 324, and 326 may send a status signal back to microcontroller 302, which in turn may send a simple control signal to a respective POL converter based on the status information received from the respective POL converter. In general, microcontroller 302 checks status for one POL converter at a time, which may be viewed as a disadvantage when more interactive, real-time communication is desired in a system.

FIG. 4 illustrates one example of a single function implemented in a DPA system. Typically, a supply controller 350 (providing control for executing the function) and DC-to-DC voltage converters 352, 354, 356, and 358 are connected in a point-to-point configuration as shown. Supply controller 350 is coupled to each DC-to-DC converter over dedicated lines, (typically analog lines are used for implementing most functions), more specifically over lines 372 and 362 to converter 352, lines 374 and 364 to converter 354, lines 376 and 366 to converter 355, and lines 378 and 368 to converter 358. Input supply voltage VIN 360 is coupled to each DC-to-DC converter, and in turn DC-to-DC converter 352 may produce, for a respective POL or POLs, DC output voltage 370, DC-to-DC converter 354 may produce DC output voltage 372, DC-to-DC converter 356 may produce DC output voltage 374, and DC-to-DC converter 358 may produce DC output voltage 376.

One important function (that may be executed by supply controller 350) that is fast becoming a driving force in modern system design is the monitoring and optimizing of the current consumed by electronic equipment, more notably equipment that may be powered by the DC-to-DC converters shown in FIG. 4. This trend is driven not only by power efficiency requirements, but also by the need for efficient heat management within equipment enclosures and load balancing to avoid damaging power supply systems such as DC-to-DC converters 352, 354, 356, and 358. One aspect of successful power management is the ability to accurately measure the current consumed by various components of the system.

Currently, typically only relatively expensive power supplies provide accurate measure of their load currents. In general, low-cost supplies provide at most a simple over-current detection circuit. Such a circuit, illustrated in FIG. 5, typically consists of a fixed comparator 556, and possibly an amplifier 554, which monitors the voltage across a resistive element 552 coupled in series with the load. When this voltage exceeds some fixed threshold, as indicated by over-current fault output 551, the supply might notify the system via a digital output and possibly shut down the load. More sophisticated devices allow the voltage threshold of comparator 556 to be programmed, thereby allowing control of the over-current threshold.

Power supplies that provide true load-current measurement typically utilize an accurate analog-to-digital converter (ADC). The ADC monitors the voltage across a series of resistive elements and converts that voltage to digital codes made available to the host system. These ADCs generally feature an output resolution of 6-bits or more. Their conversion speeds may vary widely depending on how over-current faults are detected. Most systems typically require that over-current conditions be detected within several microseconds. Either the ADC must sample at comparable rates, or an additional over-current monitor circuit similar to the circuit shown in FIG. 5 may be used. In addition, more expensive systems may provide detection of both negative load currents (i.e. current forced into the supply) and under-current fault detection (i.e. when this current becomes too negative).

Many other problems and disadvantages of the prior art will become apparent to one skilled in the art after comparing such prior art with the present invention as described herein.

SUMMARY OF THE INVENTION

In one set of embodiments, a current-tracking system may provide accurate and cost-effective sensing of load currents and over-current/under-current faults without requiring a fast ADC. A simple DAC, a fast comparator, and digital logic may be configured to track the average value of a load current over a period of time. A tracking circuit coupled to a comparator may be configured to perform current measurement, over-current detection, and under-current detection, with the DAC and comparator shared by all three functions.

An estimated average value of the load current may be programmed and provided to the input of the DAC, which in turn may generate a voltage corresponding to that estimated average value. A comparator may be used to compare that voltage with a sense voltage that corresponds to the actual load current, which may be obtained from a current sense circuit comprising the load. The estimated average value may then be adjusted based on a sample of the comparator output, the estimated average value thereby tracking the load current over time. Specified over-current (OC) and under-current (UC) values may also be programmed and selectively provided to the input of the DAC, which may generate respective voltages corresponding to the OC and UC values. The comparator may then be used to compare these respective voltages with the sense voltage to respectively detect OC and UC faults. Noise immunity may be increased by integrating a number of comparator samples instead of a single comparator sample before the estimated average value is adjusted. Using multiple samples may also provide a measure of the error between the estimated average value and the actual load current, improving the efficiency of monitoring the load current.

In one set of embodiments, the time needed to track to a new load current value may be improved by adjusting the step size of the correction made to the estimated average value during each subsequent cycle. The value of the step size may be increased after each correction that may indicate that too small of a correction was made to the estimated average value, resulting in a larger correction to the estimated average value on the following cycle. This process may be repeated until the estimated average value has passed the load current value. That is, each time the estimated average value fails to reach a new load current, a bigger step may be taken on the following attempt. When the actual load current is reached, the step size may be reset to a previously specified value, which may be a unit step.

In some embodiments, the response time to an OC or UC fault may be improved by disabling the tracking mode upon having encountered a fault condition, and performing the OC and UC checks every switch cycle rather than every other switch cycle, until the fault condition is no longer detected. Other functionality may also be disabled until the fault condition is no longer detected. In addition, UC checks may be disabled, thereby making it possible for the OC check to be performed continuously, improving the response to an OC condition. Noise immunity may be improved by counting the number of consecutively detected OC/UC faults. An actual OC/UC fault may only be indicated when the count reaches a predefined value. That is, a specified number of cycles may be counted prior to taking corrective action such as the disabling of the voltage output.

Noise immunity may be further improved in some embodiments by implementing two-level protection, with the estimated average value configured to provide an additional level of OC and UC detection. The estimated average value may be compared against programmed average OC and UC limits. An average-OC value and an average-UC value may be programmed, with corresponding signals provided to respective comparators, which may be used to compare the value of the estimated average value to the programmed average-OC and average-UC values. The average-OC value and average-UC value may be selected to be respectively lower and higher than the programmed OC limit and UC limit, resulting in a higher resolution but slower response to large OC and small UC currents.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which:

FIG. 10 shows a diagram of over-current/under-current sample timing for downslope sensing, according to one embodiment;

FIG. 11 shows a diagram of over-current/under-current average-sample timing for downslope sensing, according to one embodiment;

Figure 1:
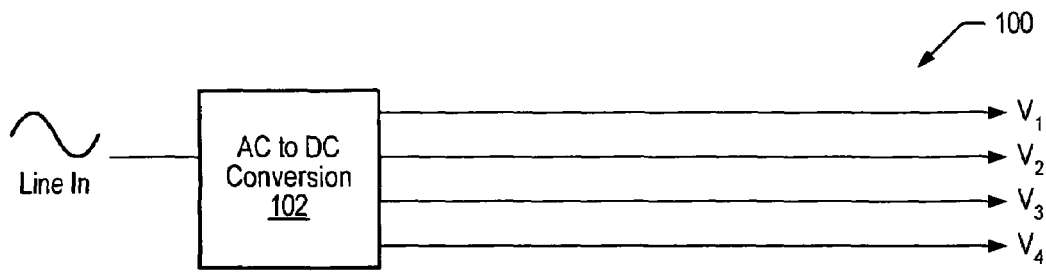
FIG. 1 shows one embodiment of a power distribution circuit according to prior art.
Figure 2:
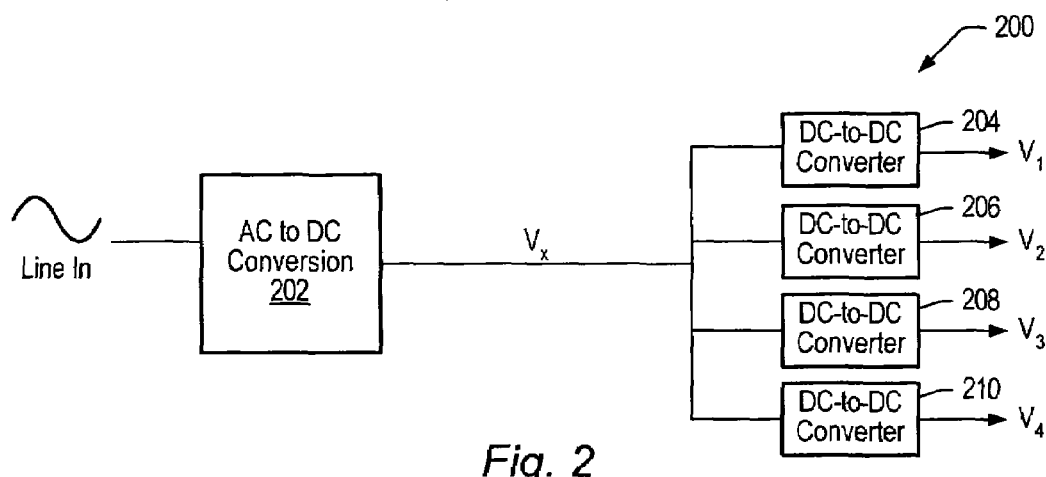
FIG. 2 shows a distributed power architecture (DPA) according to prior art.
Figure 3:
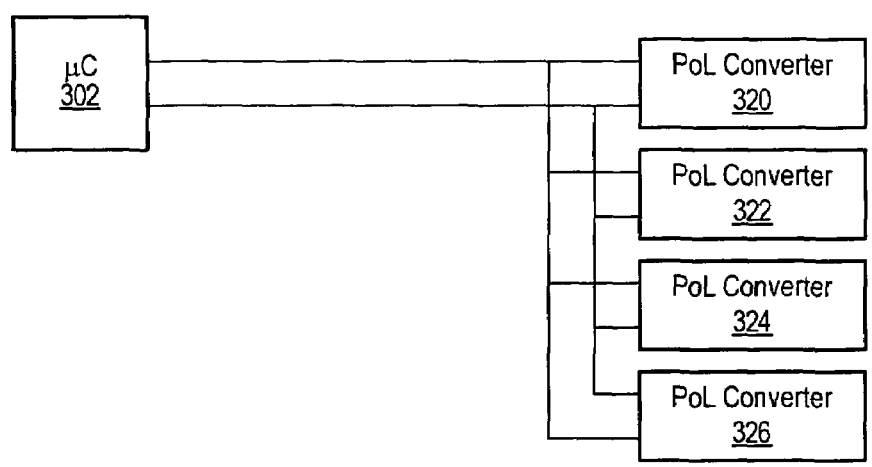
FIG. 3 shows one embodiment of a system in which a microcontroller communicates with POL converter devices over an $I^2C$ bus, according to prior art.
Figure 4:
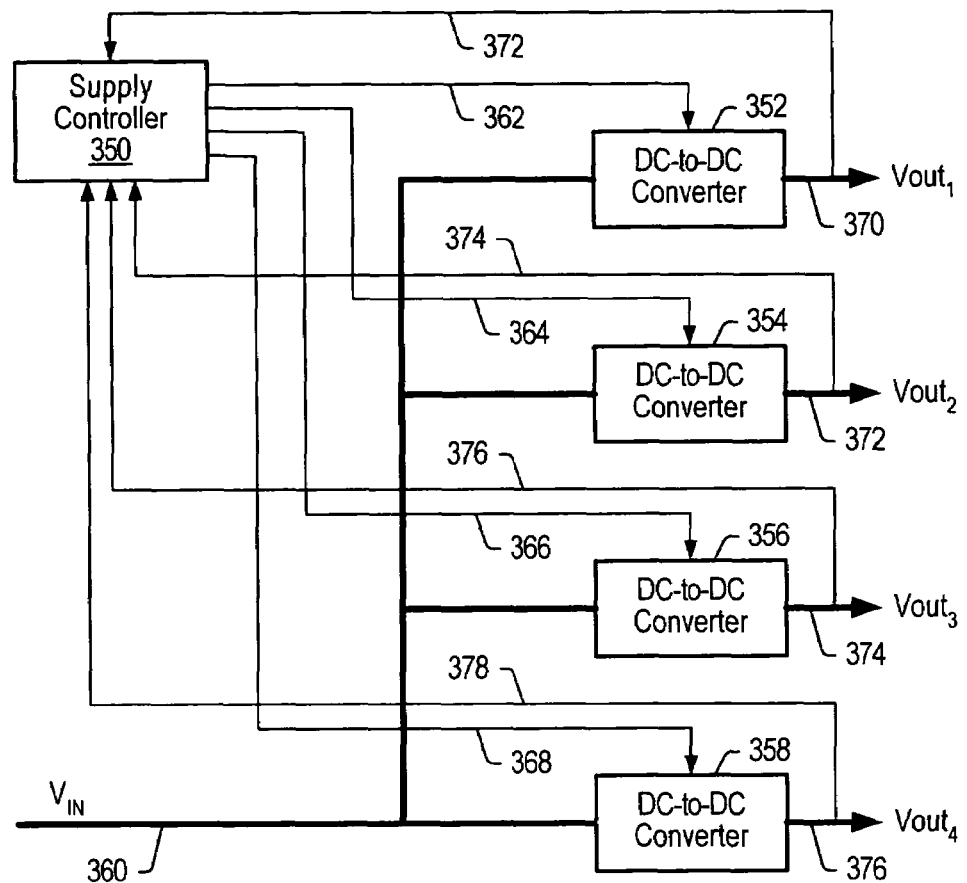
FIG. 4 shows one embodiment of a system in which DC-to-DC voltage converters are interconnected in a point-to-point configuration, controlled by a central supply controller to perform a specific function, according to prior art.
Figure 5:
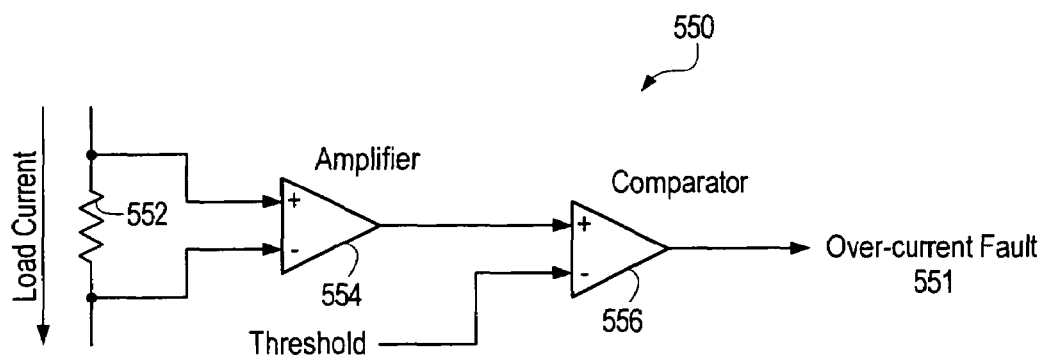
FIG. 5 shows one embodiment of an over-current detection circuit, according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

The following references are hereby incorporated by reference in their entirety as though fully and completely set forth herein:

U.S. Patent Application Publication No. 2004/0201279 (Ser. No. 10/820,976), titled "Method And Apparatus For Improved DC Power Delivery, Management And Configuration," filed Jun. 21, 2004.

U.S. patent application Ser. No. 11/198,698, titled "Method For Using a Multi-Master Multi-Slave Bus For Power Management," filed Aug. 5, 2005.

Figure 6:
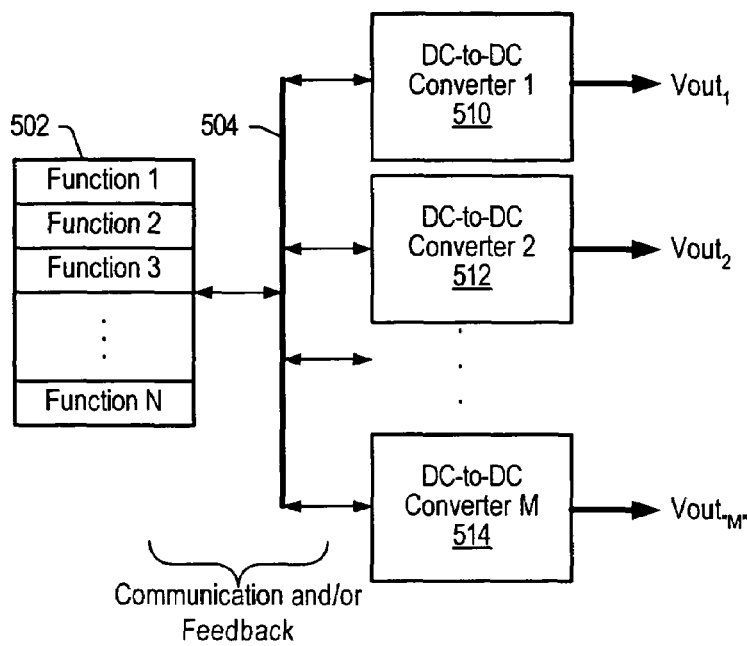
FIG. 6 shows one embodiment of a system featuring improved DC power delivery, management and configuration.

FIG. 6 is a block diagram of one embodiment of a power distribution system. As shown, the common functions required in a complex DC power system may be combined in a single controller rather than treated as separate IC functions. As illustrated in the embodiment of FIG. 6, a controller 502 managing functions 1 through N may be coupled to DC-to-DC converters 1 through M (illustrated by example as power converters 510, 512 and 514) via a digital bus 504. Digital bus 504 may be a serial bus enabling communication with reduced wiring requirements. In the configuration shown in FIG. 6, real-time communication is made possible between power converters 510, 512, and 514 and controller 502 by their being coupled to serial digital bus 504. It is noted, however, that in other embodiments the power converters may communicate with the controller 502 and with each other by other means, e.g., a parallel bus.

Figure 7:
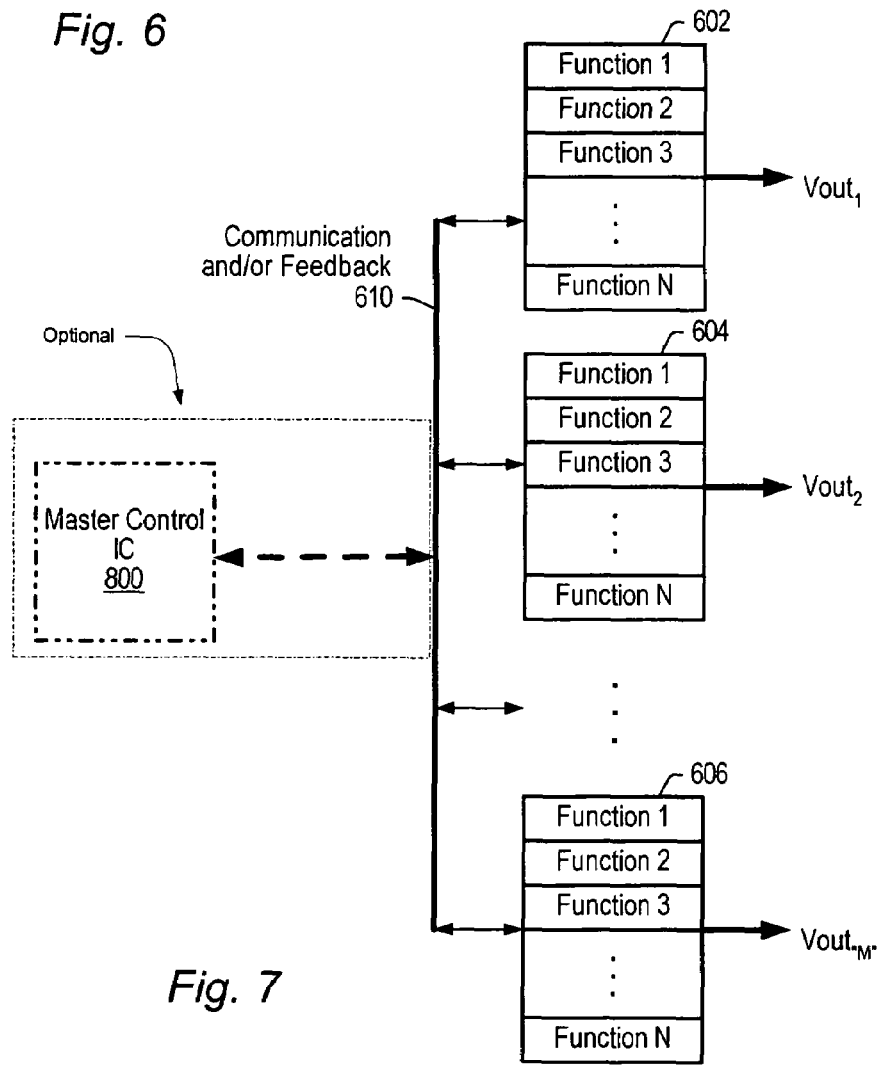
FIG. 7 shows one embodiment of the interconnection of digital power management devices (DPMDs)

The illustrated embodiment of FIG. 7 provides a system-oriented solution using mixed-signal IC technology, allocating one unit of each function to a single point of load (POL) IC, or digital power management device (DPMD). In this embodiment, one DC-to-DC voltage converter, one unit of supply sequencing, one unit of load monitoring, and one respective unit of various other functions (previously discussed) are combined in each DPMD, e.g., in each of DPMD 602, DPMD 604, and DPMD 606.

As illustrated in the embodiment of FIG. 7, DPMDs 602, 604, and 606 have each been allocated Functions 1 through N, and are coupled together via serial digital bus 610. Bus 610 may be simpler than an I2C bus and may offer more control and signaling, including real-time data feedback capability. Bus 610 may also allow each DPMD to be coupled to a master control IC (MCIC) 800, or to be coupled only to each other, enabling all system level functions to be configured, controlled and monitored providing simple and flexible results. MCIC 800 is shown mostly for illustrative purposes, and preferred embodiments may omit MCIC 800 and only include DPMDs coupled to bus 610, where all required functions may be controlled by a single DPMD or a group of DPMDs operating together. By configuring each POL device or DPMD to have the ability to communicate with any other POL device or DPMD coupled to bus 610, each POL device or DPMD may act as either a master or a slave on bus 610, thereby obviating the need for MCIC 800 where it may be desirable to design a power delivery system without MCIC 800, or without any other similar central control unit.

Various embodiments, as illustrated in FIG. 7, provide a modular approach to designing DPA systems, providing system level functionality without requiring the system to be individually and separately configured for each desired function that may be required. Each DPMD may be individually configured prior to its being placed in the system, and may operate to perform all necessary functions by having access to real-time feedback information over bus 610, and by communicating with other DPMDs. This represents active control as opposed to simple status monitoring. Several devices may be enabled when the DPA system is configured as illustrated in the embodiment FIG. 7. Rather than just having a DC-to-DC converter, a DPMD may comprise a DC-to-DC converter, and any or all of the associated control, configuration and monitoring functions associated with a single node.

Figure 8A:
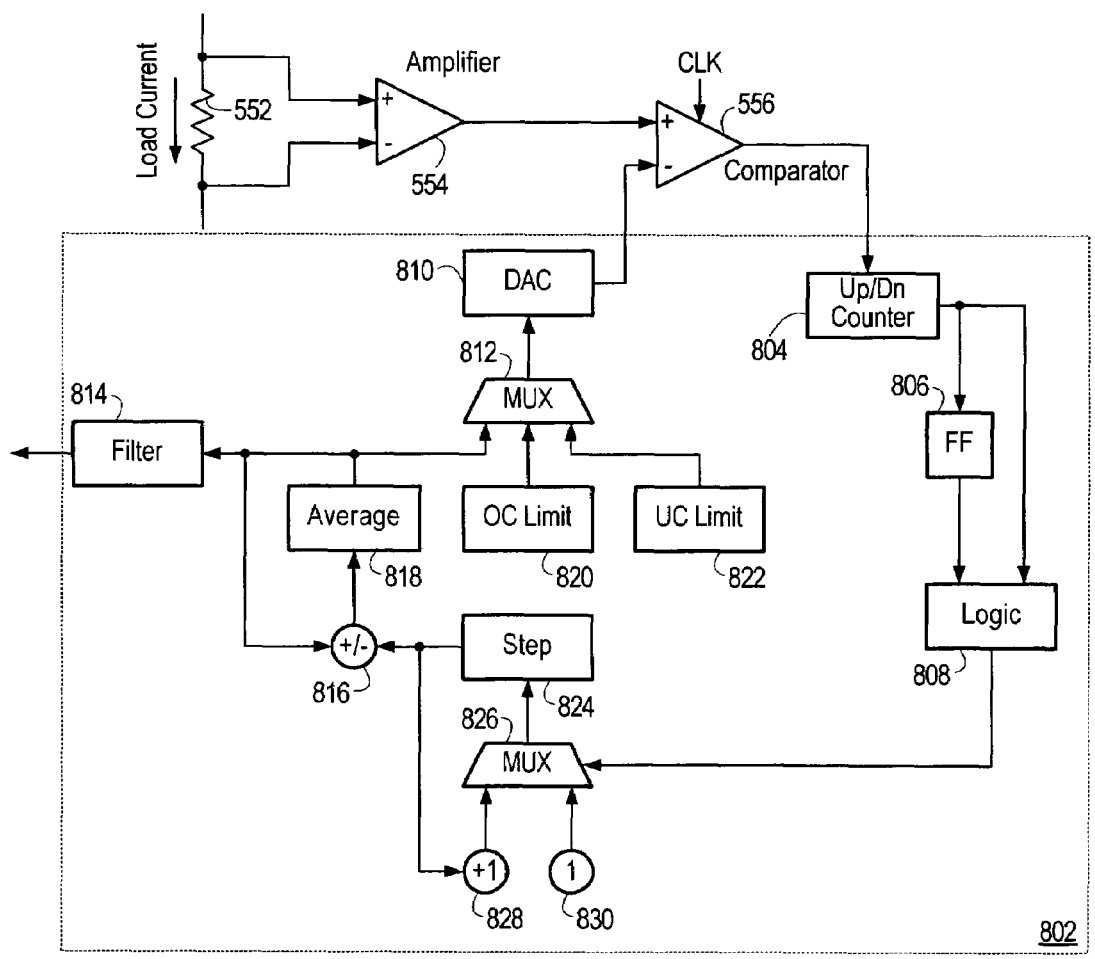
FIG. 8A shows one embodiment of a cost effective load current and fault sensing circuit.

One of the functions that may be performed by each DPMD shown in FIG. 7 is the monitoring and optimizing of the load current flowing through the load (or loads) to which the respective voltage output of each DPMD is applied. In one set of embodiments, a current-sense system may provide accurate and cost-effective sensing of load currents and faults, both over-current and under-current, without the use of a fast analog-to-digital converter (ADC). A simple digital-to-analog converter (DAC), a fast comparator, and digital logic may be configured to measure the load current using a 'mean tracking' technique. One embodiment of such a current-sense system is shown in FIG. 8A. Circuit 802 coupled to comparator 556 may be configured to perform a set of three functions comprising current measurement, over-current detection, and under-current detection. DAC 810 and comparator 556 may be shared by the three functions.

During a first time period, the digital input of DAC 810 may be set to a programmed over-current (OC) limit value 820, which may be selected via multiplexer (MUX) 812. Comparator 556 may then be sampled to determine if the sensing voltage corresponds to a load current greater than programmed OC limit 820, that is, if an over-current condition has occurred. During a second time period, DAC 810 may be controlled by a programmed under-current (UC) limit 822, which may also be selected via MUX 812. Comparator 556 may then be sampled to detect an under-current condition. During a third time period, DAC 810 may be set to an "estimate" of the mean load current (Average) 818, also selectable via MUX 812. Comparator 556 may then be sampled to detect if this estimate is either greater than or less than the actual load current. If the estimate is greater than the actual load current, the estimate may be reduced. If the estimate is less than the actual load current, the estimate may be increased. By configuring DAC 810 to monitor the load current, the estimate 818 may be used to track the load current over time, thus providing an average measurement capability without using an expensive ADC. Filter 814 may provide additional processing of the average value 818 over multiple cycles to improve the available resolution for monitoring purposes.

Circuit 802 may also be configured to provide noise immunity during the third time period, that is, when the average load current is tracked. Rather than taking a single comparator sample, the comparator may be monitored over a time period using Up/Down counter 804. On each comparator sample that indicates the estimated Average 818 is too large, counter 804 may increment, otherwise it may decrement. At the end of the time period, the final value of counter 804 may be used to determine the accuracy of the estimate. Using the output of counter 804, flip-flop 806 and logic block 808 may be configured to generate a control signal that may be used for incrementing/decrementing the value of Average 818. A positive value for the estimate (i.e. a positive value for the output of counter 804) may indicate that the estimate is too large, and Average 818 may be decreased. A negative value for the estimate (i.e. a negative value for the output of counter 804) may indicate that the estimate is too small, and Average 818 may be increased. Noise immunity may therefore be provided by integrating a number of comparator samples instead of basing the decision to update Average 818 on a single sample of the output of comparator 556. This may also provide a measure of the error between the estimate and the actual load current. For example, if counter 804 ends with a large positive or negative value, most comparator samples would indicate that the estimate was either too large or too small. This information may be used to make a larger correction to the estimate in an attempt to track to the actual mean load current quicker, as will be further discussed below.

The correction made to Average 818 during the third time period may be configured in a way to improve the ability of circuit 802 to track a load current as it changes. In one embodiment, Average register 818 is either incremented or decremented by 1, depending on the results of counter 804. This may be accomplished by selecting input 830 of MUX 826. Furthermore, the time needed to track to a new load current value may be improved if larger corrections are made, when warranted. One way of improving the tracking time is by including a Step register 824. Step register 824 may hold the correction that will be made to Average register 818 during the subsequent cycle. The value of Step register 824 may either be added to Average register 818 or subtracted from Average register 818 depending on the sign of the counter at the end of the period. When incrementing or decrementing by 1, input 830 of MUX 826 may be selected. The value of Step register 824 may be increased by selecting input 828 of MUX 826, effectively stepping Step 824 up by '1'.

After each correction, the counter sign not changing from the previous tracking period may indicate that too small of a correction was made to Average 818. Therefore, the value of the Step 824 may be increased by 1 (input 828 of MUX 826 selected), thus resulting in a larger correction to Average 818 on the following cycle. This process may continue until the counter either reaches a value of 0, or changes sign (positive to negative, or negative to positive, meaning that the value of Average 818 has passed the load current value. This may force the value of Step 824 back to 1 (input 830 of MUX 826 selected). In other words, each time the value of Average 818 fails to reach a new load current, a bigger step may be taken on the following attempt. When the target, that is the actual load current, is reached, the value of Step 824 may be reset to 1.

Figure 9B:
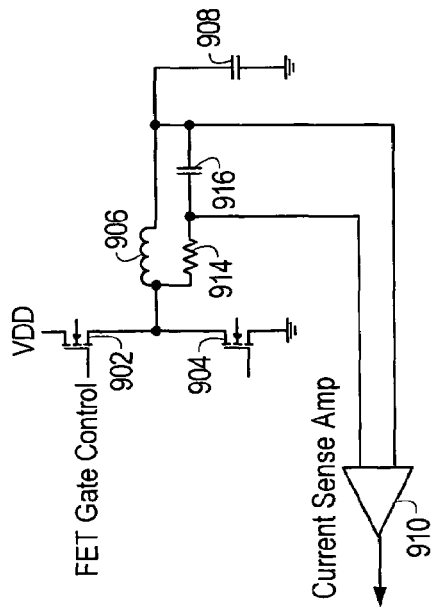
FIG. 9B shows one embodiment of a DCR current sense circuit for use in a load current and fault sensing system.
Figure 9D:
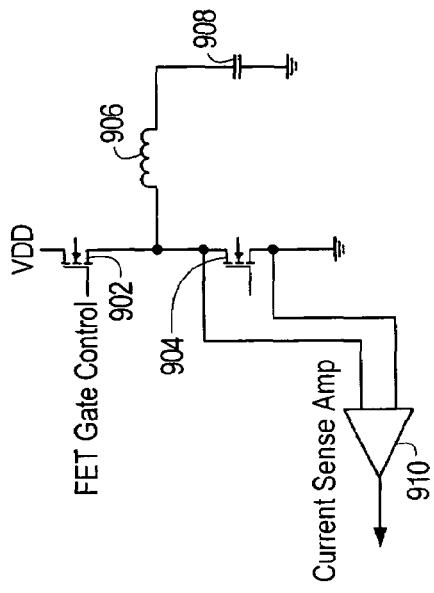
FIG. 9D shows one embodiment of a low-side FET current sense circuit for use in a load current and fault sensing system.
Figure 9A:
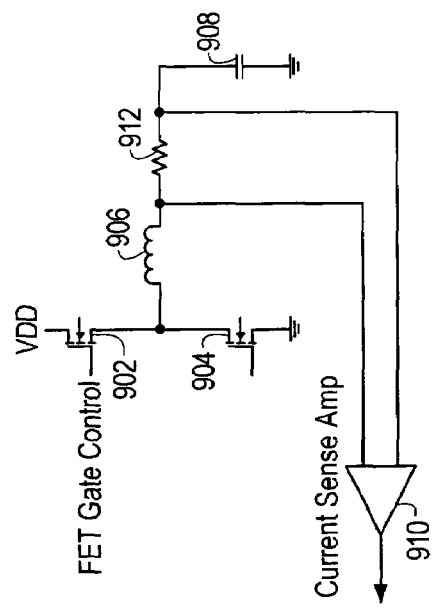
FIG. 9A shows one embodiment of an in-line resistive current sense circuit for use in a load current and fault sensing system.
Figure 9C:
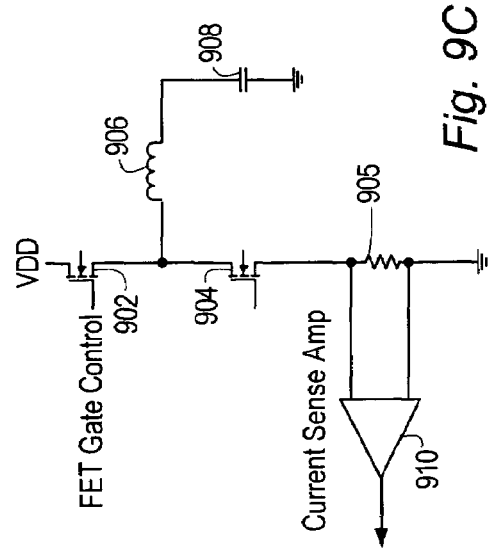
FIG. 9C shows one embodiment of a low-side resistive current sense circuit for use in a load current and fault sensing system.

While FIG. 8A shows a resistor 552 being used as the current sense element to convert current to voltage, alternate embodiments may feature any number of current-sensing methods. FIG. 9A shows a resistor 912 configured in series with the inductor 906 of a switching power stage to convert the inductor current to a voltage. In the embodiment shown in FIG. 9A, current sensing may occur during either phase of the FET 902 Gate Control signal. Current sense amp 910 performs the function that amplifier 554 is configured to perform in the embodiment of FIG. 8A. FIG. 9B shows an alternate embodiment in which capacitor 916 is added to sense the current flowing in inductor 906, taking advantage of the parasitic resistance of inductor 906 itself. The additional RC circuit, comprising resistor 914 and capacitor 916, may be tuned to force the voltage across capacitor 916 to match the voltage across the parasitic resistance of inductor 906. In the embodiment of FIG. 9C, a resistor 905 is configured in series with the low-side transistor 904. When low-side transistor 904 is enabled, resistor 905 will functionally be in series with inductor 906, and may operate to convert the current in inductor 906 to a voltage. When using the configuration shown in FIG. 9C to sense current, current samples may be taken during the low phase of the FET 902 Gate Control. Finally, FIG. 9D shows one embodiment in which the on resistance of low-side transistor 904 itself is used as a means of converting the current flowing in inductor 906 to a voltage. Other embodiments to convert sensed current to a voltage that may be used with comparator 556 in various embodiments of the present invention are possible and are contemplated, and the embodiments of FIGS. 9A-9D are not meant to be exhaustive but merely exemplary.

Depending on the type of power supply, the timing of when comparator samples are taken may become important. In particular, switching regulators may typically exhibit both switching noise and inductor ripple currents, both of which may need to be considered. Care may be taken to avoid sampling the sensed load current near switching events. Also, depending on the power stage design, the load current signal may only be available during specific intervals. For example, when using a low-side sense resistor, as shown in FIG. 9C, the voltage across resistor 905 may only reflect the inductor current (flowing in inductor 906) when low-side FET 904 is enabled (i.e. when FET 902 Gate Control is de-asserted). In many embodiments, the over- and under-current detection may preferably be applied to the maximum and minimum inductor current, respectively. Depending on the current sense method used, the current signal may only be available when FET 902 Gate control signal is high (referred to as up-slope sensing). Otherwise, FET 902 gate control may be required to be low (referred to as down-slope sensing).

Referring to FIG. 10 for down-slope sensing, the OC sample 940 and under-current UC comparator sample 946 may be delayed relative to the FET Gate Control signal 934, as indicated by UC sample delay 932 and OC sample delay 930. This allows accounting for delay in the power-stage driver response, and avoiding switching noise, indicated by Noise Keep-Out zones 944. FET Gate Control signal 934 may be a pulse width modulated (PWM) signal pulse. For OC sample(s) 940, comparator 556 may sample near the peak of inductor current waveform 942 after the switching noise has dissipated. For UC sample(s) 946, the comparator may sample near the valley of inductor current waveform 942 before the next switching noise disturbances begin. In one set of embodiments, OC Sample Delay 930 and UC Sample Delay 932 may be configured as programmable offsets, and two counters (not shown) may be employed to measure OC Sample Delay 930 and UC Sample Delay 932 relative to FET Gate Control 934, in order to optimize the sample timing. After each sample has been taken, control of DAC 810 may be switched to the next sample value to allow the output of DAC 810 to settle before that sample time arrives, as illustrated by DAC settling time 937 for UC sample(s) 946, and DAC settling time 938 for OC sample(s) 940. A third timer may be used to verify that DAC 810 has had sufficient time to settle. If not, that sample may either be skipped or delayed.

In one set of embodiments, both an OC sample 940 and UC sample 946 may be taken during the same switching cycle. For example, OC sample 940 may be taken shortly after FET Gate Control 934 is de-asserted, and UC sample 946 may be taken shortly before FET Gate Control 934 is asserted. For up-slope sensing, UC sample 946 may be taken shortly after FET Gate Control 934 is de-asserted, and OC sample 940 may be taken shortly before FET Gate Control 934 is asserted. However, as can be seen in FIG. 10, DAC settling times 937 and 938 would have to be shortened to allow two samples to be taken during each switching cycle.

During the average tracking cycle, two counters—as previously mentioned—may be used to avoid taking comparator samples during noise or invalid current sense times. As shown in FIG. 11, unlike OC and UC checks, multiple samples 948 may be taken during average tracking. In other words, instead of tracking a single point measurement, an average may be tracked over time. This may help in averaging out noise, and decreasing sensitivity to exact sample timing. For example, since a ripple current may be roughly linear, a single sample taken at around the mid-point of the portion of the switching cycle where Gate Control 934 is de-asserted may suffice to determine if the value in the Average register 818 is too large or too small. However, this may require knowledge of how long Gate Control 934 will be de-asserted. Given that the duty cycle of FET Gate Control 934 may change from cycle to cycle, this information may not always be available. By sampling during the entire phase and using Up/Down counter 804 as previously described, the length of the phase may become unimportant.

Figure 12:
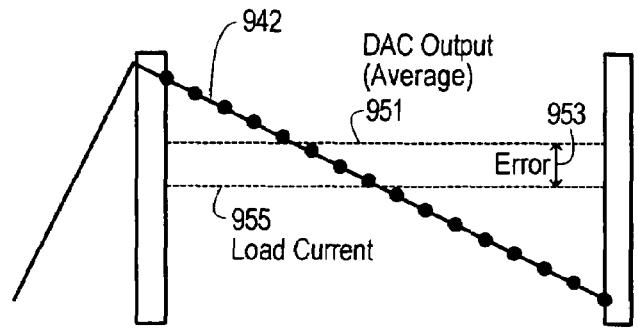
FIG. 12 shows a timing diagram of Up/Down counter values during average cycles, according to one embodiment.
Figure 13:
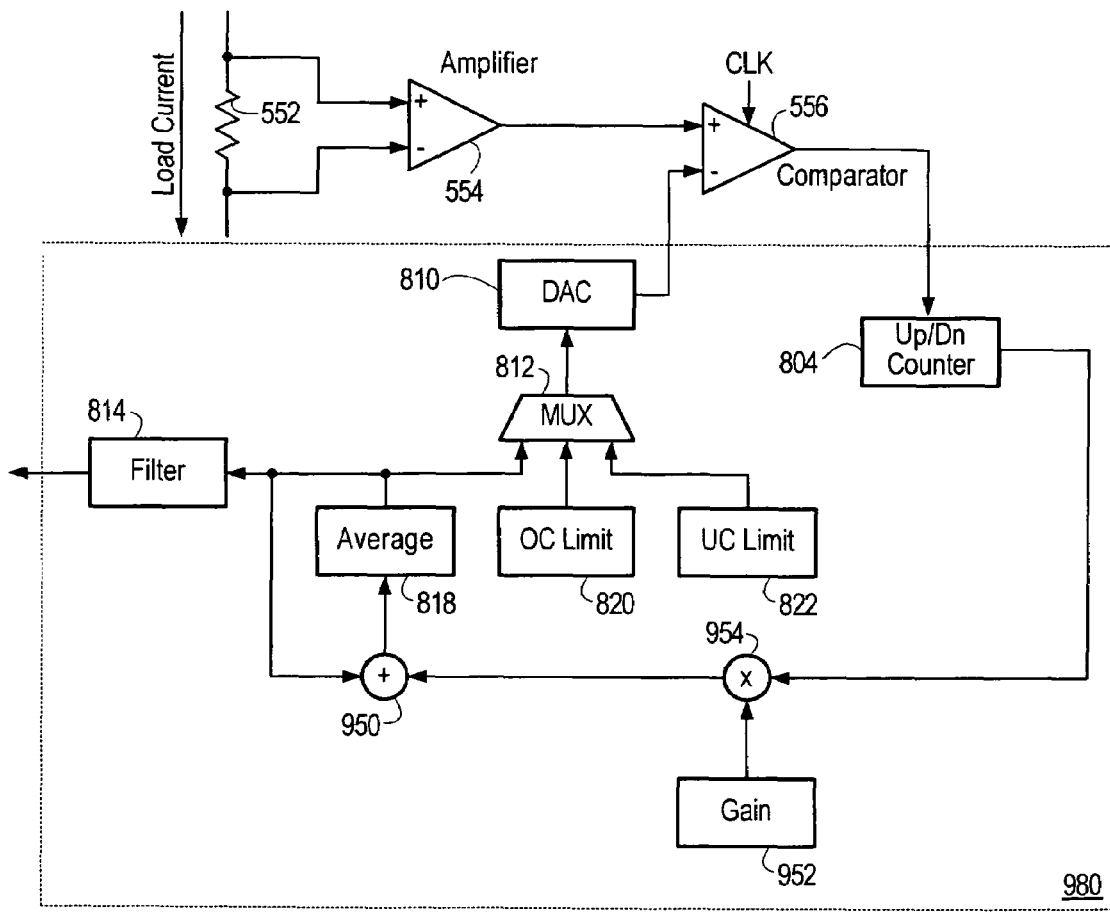
FIG. 13 shows an alternate embodiment of a cost effective load current and fault sensing circuit implemented using a multiplier.

As previously discussed, the value of Up/Down counter 804 at the end of each average sample cycle may reflect the error magnitude between the value contained in Average register 818 and the actual load current. FIG. 12 further illustrates the values that may be produced by Up/Down counter 804 during Average cycles. Up/Down counter 804 may count up when comparator 556 indicates that the sense voltage corresponding to load current 955 is greater than the output of DAC 810, and may count down when the sense voltage corresponding to load current 955 is below the output of DAC 810. In the example shown in FIG. 12, Up/Down counter 804 is configured to count up 5 counts and down 11 counts, resulting in a final value of −6. Error 953 between the DAC output Average estimate 951 of the load current and actual load current 955 may be given by:

$$\text{Error} = \text{Gain} * \text{Counter} \quad (1)$$

where Gain may be derived primarily from the slope of the current waveform 942, which may be determined by the power stage design and input and output voltages. FIG. 13 shows one embodiment, with circuit 980 configured with this feature to improve the response time of the Average tracking circuit to load changes. As suggested by equation 1, the output of Up/Down counter 804 may be multiplied by Gain 952 to produce the error, which may be added (950) to the present value of Average register 818 to obtain the corrected expected value.

Figure 14:
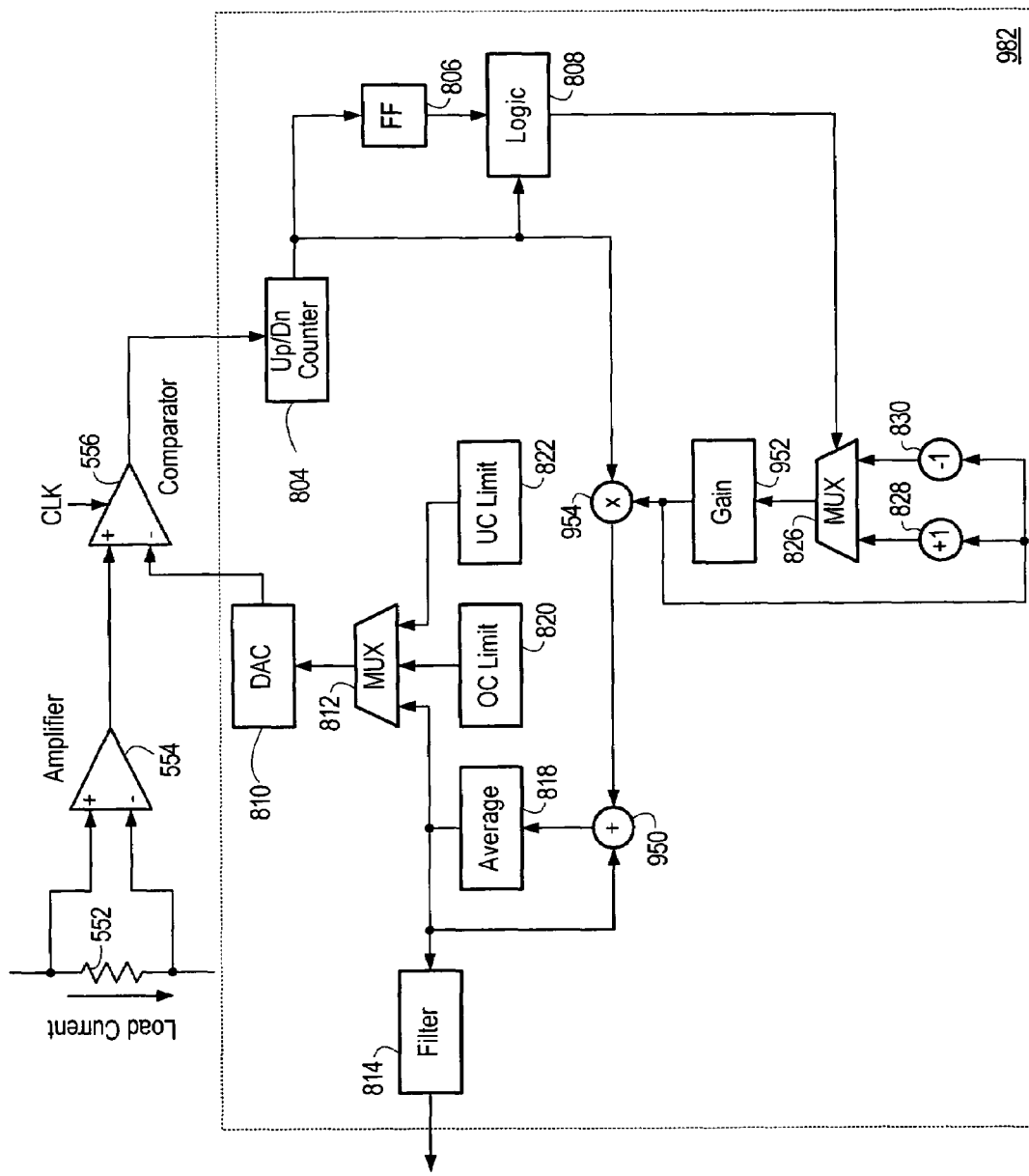
FIG. 14 shows an alternate embodiment of a cost effective load current and fault sensing circuit implemented using a gain adaptive filter.

The Gain component of the embodiment introduced above may be estimated by use of an adaptive circuit, as shown in circuit 982 of FIG. 14. If the sign of the value produced by counter 804 does not change from the previous value, the previous correction to the value of Average 818 may have been too small. Hence, the value of Gain 952 may be incremented. If the value produced by counter 804 is 0, the previous correction may have been perfect, so the value of Gain 952 may remain unchanged. Finally, if counter 804 changes sign (hence the error changes sign), the previous correction may have been too large, so the value of Gain 952 may be decremented. This algorithm may be used to obtain a value of Gain 952 that stabilizes at the optimal value for the faster response. An additional feature of the embodiment shown in FIG. 14 is ability to measure the inductance of an inductor that may be comprised in a switching power stage (see FIGS. 9A-9D), since the optimal value of Gain 952 may directly relate to the value of the inductor. This information may be used to alter the control algorithm used in the power converter to optimize performance.

Figure 15:
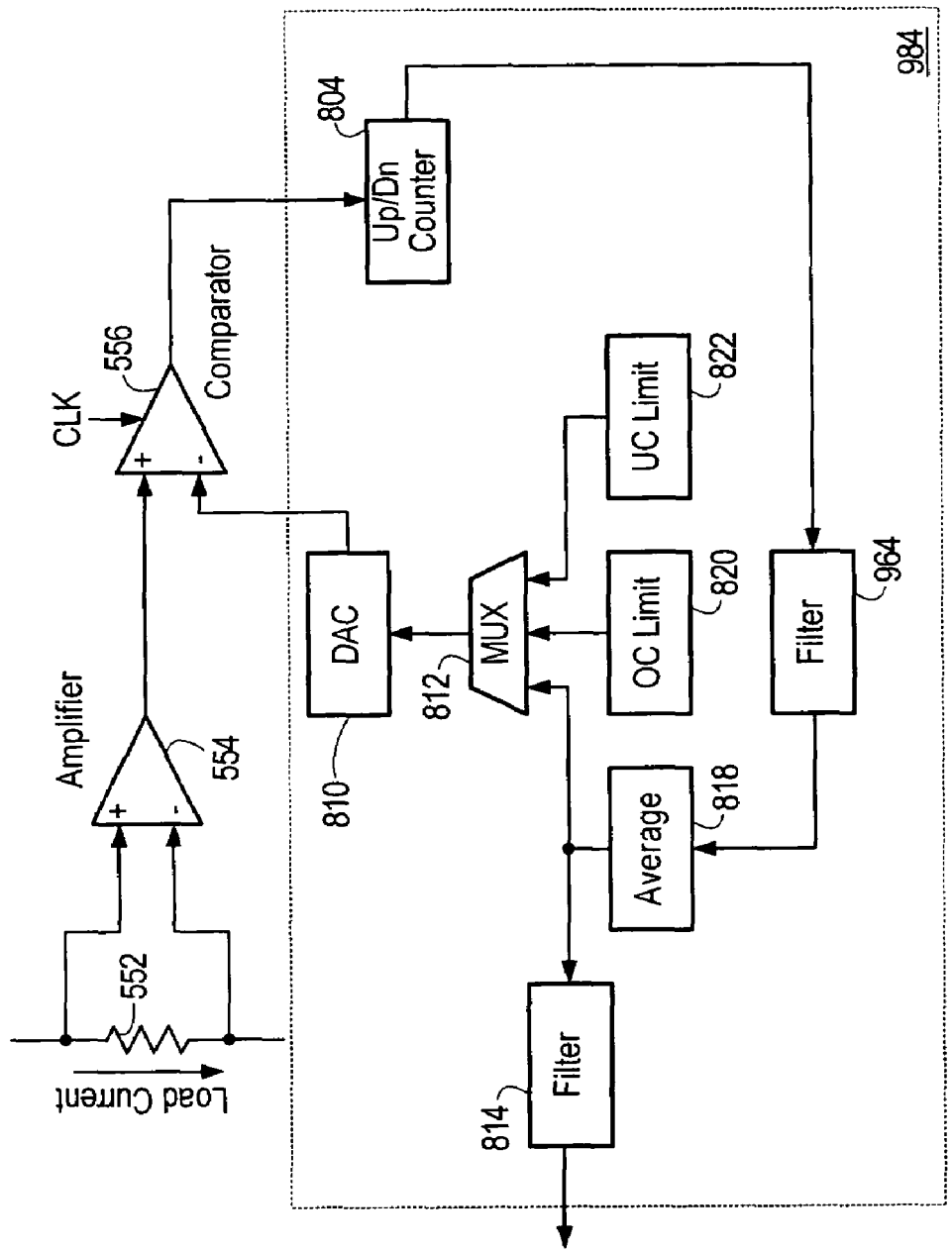
FIG. 15 shows an alternate embodiment of a cost effective load current and fault sensing circuit implemented using a delta modulation method.

In another embodiment for Average tracking of the load current, a delta modulator may be used to improve the response time to load changes, as illustrated in circuit 984 of FIG. 15. Counter 804 may be monitored throughout the tracking period. The value of counter 804 may be processed using a simple digital filter 964 whose output may be configured to update the value of Average 818, and hence the output of DAC 810, several times per cycle. By updating the value of Average 818 multiple times during the tracking cycle, the ability to respond to a moving load current may be improved.

In some embodiments, the response time to an OC or UC fault may be improved by disabling the Average tracking mode upon having encountered a fault condition, and performing the OC and UC checks every switch cycle rather than every other switch cycle, until the fault condition is no longer detected. Other functionality may also be disabled until the system is back in normal operating mode and the fault condition is no longer detected. In addition, the UC checks may be disabled, thereby making it possible for the OC check to be performed continuously, improving the response to an OC condition. Noise immunity may be improved by adding a counter to the circuit. The counter may count the number of consecutive OC or UC trips detected. An actual OC or UC fault may only be declared when the count reaches a predefined value. In other words, a specified number of cycles may be counted prior to taking corrective action such as the disabling of the voltage output.

Figure 8B:
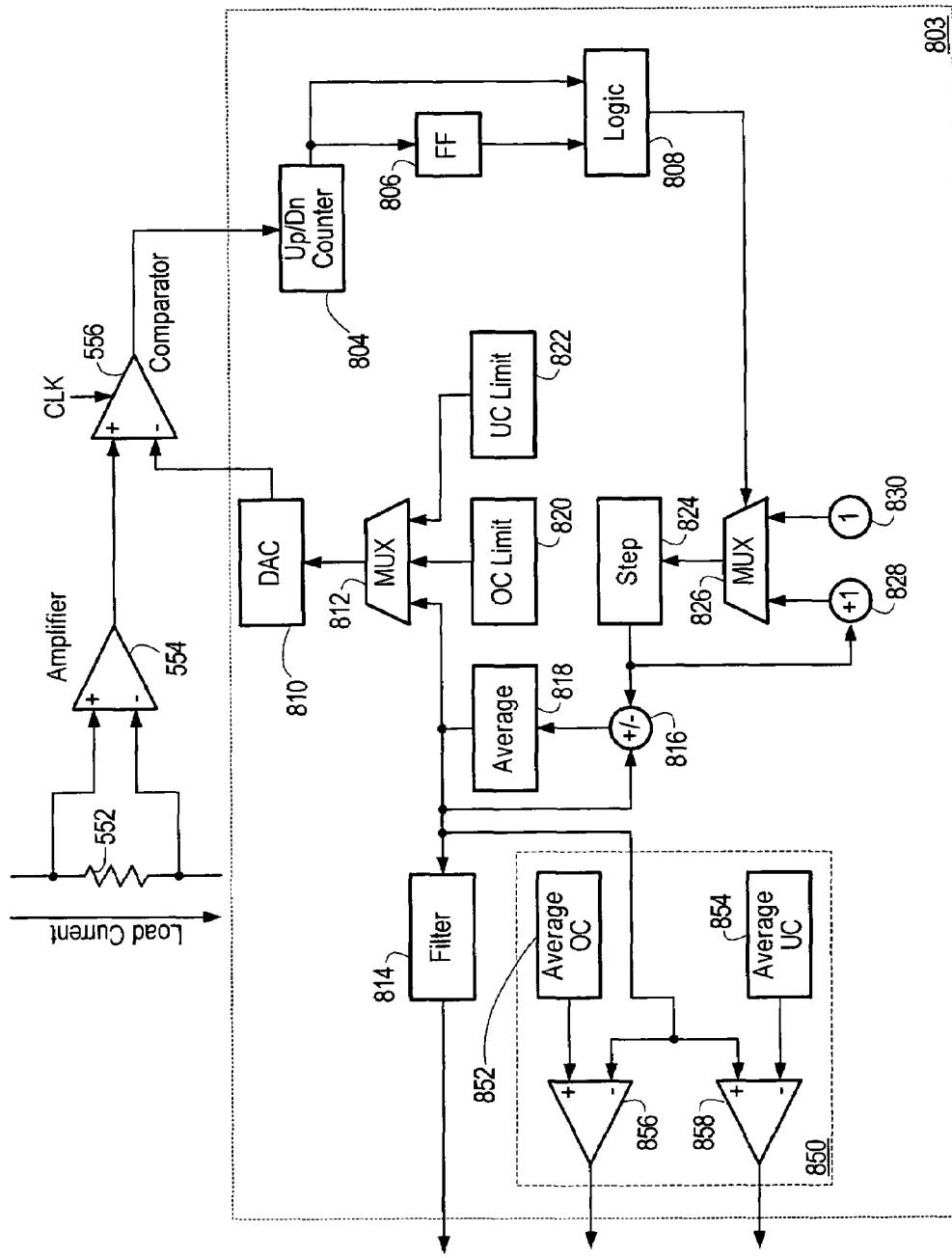
FIG. 8B shows an alternate embodiment of a cost effective load current and fault sensing circuit.

In certain embodiments, additional noise immunity may be achieved by implementing two-level protection, with the value of Average 818 configured to provide an additional level of OC and UC detection. Either software or additional hardware comparators may be respectively configured to compare the value of Average 818 against programmed average OC and UC limits. One embodiment is shown as circuit 850 configured within circuit 803 in FIG. 8B. An average-OC value 852 and an average-UC value 854 may be programmed, with corresponding signals provided to respective comparators 856 and 858, which may be used to compare the value of Average 818 to programmed average-OC value 852 and to programmed average-UC value 854. This may allow UC limit 822 to be set to a lower value, and OC limit 820 to be set to a higher value, resulting in a lower resolution but faster response to large OC and small UC currents. On the other hand, average-OC value 852 may be specified to be lower than OC limit 820, and average-UC value 854 may be specified to be higher than UC limit 822, resulting in a higher resolution but slower response—to smaller OC currents and higher UC currents. Thus, the respective outputs of comparators 556, 856 and 858 may be selectively used for indicating fault conditions accordingly.

In one set of embodiments, the circuits performing the tracking and monitoring functions (for example, circuits 802, 803, 980, 982, and 984) may be configured to automatically select the current-sense method employed by the power-stage circuitry. The selection of the current-sense method may be based on measurements of the two voltages sensed at the current sensing element. For example, if the power regulator (such as the regulators shown in FIGS. 9A-9E, for instance) is generating an output voltage with a specific value above ground, and the DC voltage on one (or both) of the current-sensing inputs (the inputs to amplifier 554 or amplifier 910, for instance) remains at or near ground, the tracking and monitoring circuit may determine that the active current-sensing method is ground-referenced, and select the appropriate current-sense amplifier characteristics. Likewise, if either (or both) current-sensing inputs are close to the regulated output voltage, the tracking and monitoring circuit may select the appropriate amplifier characteristics for output-referenced current sensing. In one set of embodiments, the tracking and monitoring circuit may be configured to force a current out the appropriate current sense input and measure the resulting current. If the input is connected to ground, the resulting voltage may be near zero, indicating ground-referenced sensing. A voltage not near zero may be the result of the sense input having been coupled to a higher impedance, indicating output-referenced sensing. Automatic selection of the current-sense method may provide an advantage in allowing the use of different sensing amplifiers for sensing the load current, with each amplifier optimized for its corresponding method. Alternatively, a single amplifier may be used, in which case the automatic selection of the current-sense method may comprise selecting controls for the bandwidth, biasing, and other characteristics of the amplifier, according to the principles described above.

Another aspect of configuring the load current monitoring and sensing circuit is to balance the maximum load current the circuit may be able to sense and the accuracy/resolution of the sensed current. For a given resolution of DAC 810, the current measurements may become progressively coarser as the size of the current to be measured increases. However, the upper portion of the available current range is typically used for sensing over-current conditions and hence may not require high resolution. For measurement of small currents, resolution is a factor that may need to be taken into consideration. The conflict arising between accuracy requirements may be satisfied if DAC 810 is configured to incorporate a companding algorithm. As a companding DAC, DAC 810 may utilize a non-linear translation of input codes to output voltages such that the available output resolution for small (near zero) input codes is finer than for large output codes (values away from zero). Typical companding functions may include μ-Law and A-Law, both of which are functions of the natural logarithm function and are well known to those skilled in the art. In one set of embodiments, DAC 810 may be configured to operate according to companding algorithms that can easily be implemented in firmware, such as a piecewise linear function or a simple square-law function. Implementing the companding algorithm in firmware allows the firmware to set the OC and UC limits correctly.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A method for monitoring load current, the method comprising:
   (a) predetermining an estimated average value corresponding to a load current to be conducted by a load;
   (b) generating a first signal corresponding to the estimated average value;
   (c) generating a second signal corresponding to the load current;
   (d) determining if the first signal is less than or greater than the second signal;
   (e) adjusting the estimated average value based on whether the first signal is less than or greater than the second signal; and
   performing (a)-(e) for a plurality of iterations, wherein the estimated average value tracks an actual average value of the load current conducted by the load over a specified period of time.

2. The method of claim 1,
   wherein said determining if the first signal is less than or greater than the second signal comprises generating a count value based on a number of times the first signal is less than or greater than the second signal; and
   wherein said adjusting the estimated average value based on whether the first signal is less than or greater than the second signal comprises adjusting the estimated average value based on the count value.

3. The method of claim 2,
   wherein said generating the count value comprises:
   incrementing a counter if the first signal is less than the second signal; and
   decrementing the counter if the first signal is greater than the second signal.

4. The method of claim 3, wherein said adjusting the estimated average value based on the count value comprises:
   incrementing the estimated average value if the count value is negative; and
   decrementing the estimated average value if the count value is positive.

5. The method of claim 2, wherein said adjusting the estimated average value based on the count value comprises adjusting the estimated average value by a specified step size.

6. The method of claim 5, further comprising adjusting the step size based on whether a sign of the count value at the end of any given iteration of the plurality of iterations is different than the sign of the count value at the end of an iteration of the plurality of iterations that immediately preceded the given iteration.

7. The method of claim 6, wherein said adjusting the step size comprises:
   incrementing the step size by a specified amount if the sign of the count value at the end of the given iteration is not different from the sign of the count value at the end of the iteration that immediately preceded the given iteration; and
   setting the step size to a default value if the sign of the count value at the end of the given iteration is different from the sign of the count value at the end of the iteration that immediately preceded the given iteration.

8. The method of claim 7, wherein the specified amount and the default value are both 1.

9. The method of claim 1, wherein the first signal and the second signal are both analog voltage signals.

10. The method of claim 1, wherein said adjusting the estimated average value based on whether the first signal is less than or greater than the second signal comprises:
- incrementing the estimated average value if the first signal is less than the second signal; and
- decrementing the estimated average value if the first signal is greater than the second signal.

11. The method of claim 1, further comprising one or more of:
- performing an over-current (OC) check comprising:
  - specifying an OC value;
  - generating a third signal corresponding to the OC value;
  - determining if the second signal is greater than the third signal; and
  - asserting a fault signal if the second signal is greater than the third signal;
- performing an under-current (UC) check comprising:
  - specifying an UC value;
  - generating a fourth signal corresponding to the UC value;
  - determining if the second signal is less than the fourth signal; and
  - asserting the fault signal if the second signal is less than the fourth signal;
- performing an average-OC check comprising:
  - specifying an average-OC value;
  - generating a fifth signal corresponding to the average-OC value;
  - determining if the first signal is greater than the fifth signal; and
  - asserting the fault signal if the first signal is greater than the fifth signal; and
- performing an average-UC check comprising:
  - specifying an average-UC value;
  - generating a sixth signal corresponding to the average-UC value;
  - determining if the first signal is greater than the sixth signal; and
  - asserting the fault signal if the first signal is less than the sixth signal.

12. The method of claim 11, wherein the first signal, the second signal, the third signal, the fourth signal, the fifth signal, and the sixth signal, are all analog voltage signals.

13. The method of claim 1, further comprising automatically identifying a method used in said generating the second signal.

14. The method of claim 13, wherein said automatically identifying the method used in said generating the second signal comprises:
- measuring a first voltage at a first terminal of the load;
- measuring a second voltage at second terminal of the load; and
- determining the method used in said generating the second signal, based on said measuring the first voltage and said measuring the second voltage.

15. The method of claim 13, further comprising selecting characteristics of an amplifier used in said generating the second signal, based on said automatically identifying the method used in said generating the second signal.

16. The method of claim 1, wherein said generating the second signal is performed according to a user configurable method.

* * * * *